(12) United States Patent
Patel

(10) Patent No.: US 8,519,018 B2
(45) Date of Patent: Aug. 27, 2013

(54) BIODEGRADABLE MATERIAL AND CONTAINER FOR FLUIDS

(75) Inventor: Shantu Patel, Carlsbad, CA (US)

(73) Assignee: Innovative Bottles, LLC, Carlsbad, CA (US)

( * ) Notice: Subject to any disclaimer, the term of this patent is extended or adjusted under 35 U.S.C. 154(b) by 284 days.

(21) Appl. No.: 12/709,496

(22) Filed: Feb. 21, 2010

(65) Prior Publication Data

US 2011/0089173 A1    Apr. 21, 2011

Related U.S. Application Data

(63) Continuation-in-part of application No. 12/603,395, filed on Oct. 21, 2009.

(51) Int. Cl.
*C08F 2/42* (2006.01)
*C08J 3/28* (2006.01)

(52) U.S. Cl.
USPC .......... 522/162; 522/87; 522/88; 522/89; 522/113; 522/121; 522/120; 522/178; 522/182; 522/172; 522/148; 522/144

(58) Field of Classification Search
USPC .......... 522/103, 100, 104, 107, 99, 96, 90, 522/113, 121, 120, 178, 182, 172, 148, 87, 522/88, 89, 134, 135, 144, 162
See application file for complete search history.

(56) References Cited

U.S. PATENT DOCUMENTS

| 6,736,898 | B2 | 5/2004 | Schrof | |
|---|---|---|---|---|
| 7,084,187 | B2 * | 8/2006 | Takase et al. | 522/153 |
| 7,279,205 | B2 | 10/2007 | Huffer | |
| 7,422,780 | B2 | 9/2008 | Suzuki | |
| 7,569,619 | B2 | 8/2009 | Esaki | |
| 2008/0145564 | A1 * | 6/2008 | Allam et al. | 427/514 |
| 2009/0047531 | A1 * | 2/2009 | Bartley et al. | 428/515 |
| 2009/0226655 | A1 | 9/2009 | Sugai | |
| 2009/0234035 | A1 * | 9/2009 | Cheung et al. | 521/81 |
| 2009/0258175 | A1 * | 10/2009 | Matsuoka et al. | 428/36.5 |

FOREIGN PATENT DOCUMENTS

JP    05086307 A  *  4/1993

* cited by examiner

*Primary Examiner* — Sanza McClendon
(74) *Attorney, Agent, or Firm* — Larry E. Severin

(57) ABSTRACT

A resin includes: an acrylate; and a curing agent to cure the acrylate. The resin is adapted to adhere to a degradable material selected from the group consisting of polylactic polymer (PLA), polyhydroxyalkonate (PHA), poly 3 hydroxybutrate co 3 hydroxyhexanote (PHBH), and paper. The curing agent includes a photoinitiator or a sensitizer that, when cured, form a hard coat when the resin is exposed to ultraviolet radiation or an electron beam.

16 Claims, 4 Drawing Sheets

BIODEGRADABLE MATERIAL AND CONTAINER FOR FLUIDS

RELATED APPLICATIONS

This application claims the benefit of the filing date of U.S. patent application Ser. No. 12/603,395, filed Oct. 21, 2009, which is incorporated herein by reference in its entirety.

BACKGROUND OF THE INVENTION

The present invention generally relates to containers and more specifically to a biodegradable material and container for fluids.

Plastic bottles are lightweight, can be molded easily at low cost, and are widely used in various industries as containers.

A "bioplastic" is biodegradable, and is shaped by being formed, molded or extruded into a desired shape.

Biodegradable products may be made from paper or bioplastic, biodegradable resins (bioplastic resins), namely, polyhydroxyalkonate (PHA), poly 3 hydroxybutrate co 3 hydroxyhexanote (PHBH), polyhydroxybutyrate-co-valerate (PHB/V), poly-3-hydroxybutyrate (PHB), chemical synthetic polymer such as polybutylene succinate (PBS), polybutylene succinate adipate (PBSA), polybutylene succinate carbonate, polycaprolactone (PCL), cellulose acetate (PH), polylactic acid/chemical synthetic polymer such as polylactic polymer (PLA) or copoly-L-lactide (CPLA), and naturally occurring polymer, such as starch modified PVA+aliphatic polyester, or corn starch.

Polylactic acid (PLA) is a transparent bioplastic produced from corn, beet and cane sugar. It not only resembles conventional petrochemical mass plastics, such as polyethelene (PE), polyethylene terephthalate (PET or PETE), and polypropene (PP) in its characteristics, but it can also be processed easily on standard equipment that already exists for the production of conventional plastics. PLA and PLA-Blends generally come in the form of granulates with various properties and are used in the plastic processing industry for the production of foil, moulds, cups, bottles and other packaging.

The biopolymer poly-3-hydroxybutyrate (PHB) is a polyester produced by certain bacteria processing glucose or starch. Its characteristics are similar to those of the petro plastic polypropylene. The South American sugar industry, for example, has decided to expand PHB production to an industrial scale. PHB is distinguished primarily by its physical characteristics. It produces transparent film at a melting point higher than 130 degrees Celsius, and is biodegradable without residue Biodegradable resins may be made into products that are relatively rigid with good transparency, and thus use of these resins may be appropriate for rigid molded products, such as bioplastic bottles and containers. These biodegradable resins, however, have poor permeability characteristic, in reference to water, oxygen and carbon dioxide. Thus a plasticizer is used to overcome the permeability issues.

A biodegradable bottle that holds fluids or carbonated drinks should provide a structure capable of withstanding the pressures resulting from several volumes of carbonation. This is made more difficult when the ambient temperature is high; partly as result of the thermoplastic nature of the bioplastic and partly as a result of the solubility of carbon dioxide in the beverage decreasing with increasing temperature. Failure of bottles under pressure tends to occur at the base. Typically, the bioplastic material in the base creeps and so is gradually extended.

Domed, generally hemispherical shapes like that of a pressure vessel are not inherently stable regarding tipping, and so the base must be provided with a flat bottomed outer base cup so that the bottle can stand upright.

Clear or translucent grade silicone liquid rubber or plasma, that is hypoallergenic, may be used in a variety of applications. Silicone characteristics include superb chemical resistance, high temperature performance, good thermal, long-term resiliency, and easy fabrication. It also possesses excellent UV resistance. This material is low volatile, peroxide free and does not discolor over time. Silicone is odorless, tasteless, chemically inert and non-toxic. It offers all FDA approved ingredients, including low compression set and fungus resistance.

SUMMARY OF THE INVENTION

In one aspect of the present invention, a resin includes: an acrylate; and a curing agent to cure the acrylate; wherein the resin is adapted to adhere to a degradable material.

In another aspect of the present invention, a resin includes: an acrylate; and a curing agent to cure the acrylate; wherein the resin is adapted to adhere to a degradable material selected from the group consisting of polylactic polymer (PLA), polyhydroxyalkonate (PHA), poly 3 hydroxybutrate co 3 hydroxyhexanote (PHBH), and paper.

In yet another aspect of the present invention, a method of coating a container including a degradable material includes: providing a resin including an acrylate; adhering the resin to the container; and curing the resin.

DETAILED DESCRIPTION

Figure 1A:
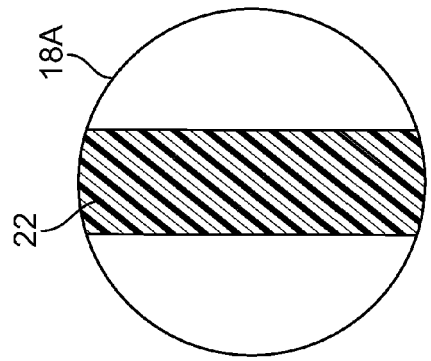
FIG. 1 depicts an embodiment of the present invention.

The preferred embodiment and other embodiments, including the best mode of carrying out the invention, are hereby described in detail with reference to the drawings. Further embodiments, features and advantages will become apparent from the ensuing description or may be learned without undue experimentation. The figures are not drawn to scale, except where otherwise indicated. The following description of embodiments, even if phrased in terms of "the invention," is not to be taken in a limiting sense, but describes the manner and process of making and using the invention. The coverage of this patent will be described in the claims. The order in which steps are listed in the claims does not indicate that the steps must be performed in that order.

An embodiment of the present invention generally provides a biodegradable bottle to stably maintain the quality of fluid contents that is capable of being subjected to waste disposal after use, lessening any adverse effect on the natural environment. Embodiments may hold fluids such as, but not limited to, carbonated drinks, water, juices, milk, medicinal products, household fluids, toiletries, cosmetic, automotive, marine and industrially used fluids. Size and shapes may vary based on fluid type and volume, from 2 oz. to over 140 oz. An embodiment of the present invention utilizes a bioplastic material, has a high rigidity and a good transparency.

A first embodiment of a bioplastic material includes a single, composite layer of bioplastic polymer mixed with plasticizer. This embodiment may be provided as a resin, which can be formed into the desired shape. A second embodiment of a bioplastic material includes a first layer of bioplastic resin and a second layer of plasticizer. This embodiment may be provided by forming the first layer into the desired shape, and then coating one or both sides of the first layer with plasticizer. In both of these embodiments, the plasticizer and resin cooperate to form a bioplastic material that may be generally impermeable to fluids. The resin may be a bioplastic polymer, and the plasticizer may be silicone such as silicon oxide or silicon dioxide. The resulting barrier property would improve the permeability rates to less than or equal to for water 1-3 units, oxygen to 3-7 units, and carbon dioxide 15-30 units, measured; at g-mil/100 square inch per day for water, and cc-mill/100 sq inch day atm @ 20 degree Celsius and 0% RH for oxygen and carbon dioxide.

Embodiments of a bottle may be constructed using any one or combination of the following or other processes:

a. adding plasticizers in 2 to 28% range (by weight) to a biodegradable resin to form a new polymer that may be highly (or generally) impermeable to fluids;

b. coating a biodegradable resin with silicone plasma;

c. coating a biodegradable resin with the plasticizer on the inside or outside; or d. lining a biodegradable resin with a membrane made of silicone hard coat resin or liquid rubber.

An embodiment of the present invention may relate to a bottle's properties. The bottle construction may add permeability, flexibility, durability and improved barrier properties, thereby increasing the diversity of the products it can hold or store, generally termed fluids. These fluids include but are not limited to, water, carbonated drinks, fluids, and juices to pills and corrosive materials. Each product the bottle is designed to hold may have its own unique stability factor. The above mentioned design options a to d, but not limited to these designs, may incorporate the stability factor in the design requirements, thereby maintaining the quality of the contents.

In an embodiment, using a biodegradable resin the bottle is formed by blow molding a hollow perform, or is molded by extrusion injection process, and then finished into a bottle which has a desired appearance by blow molding such as direct blow molding, biaxial stretching blow molding, or extrusion, etc. This same bottle can also be made from paper that is biodegradable, or a material that is otherwise photodegradable or degradable, by giving the appropriate shape and mould.

Figure 1B:
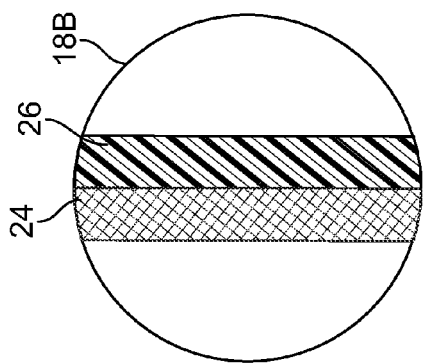
Figure 1:
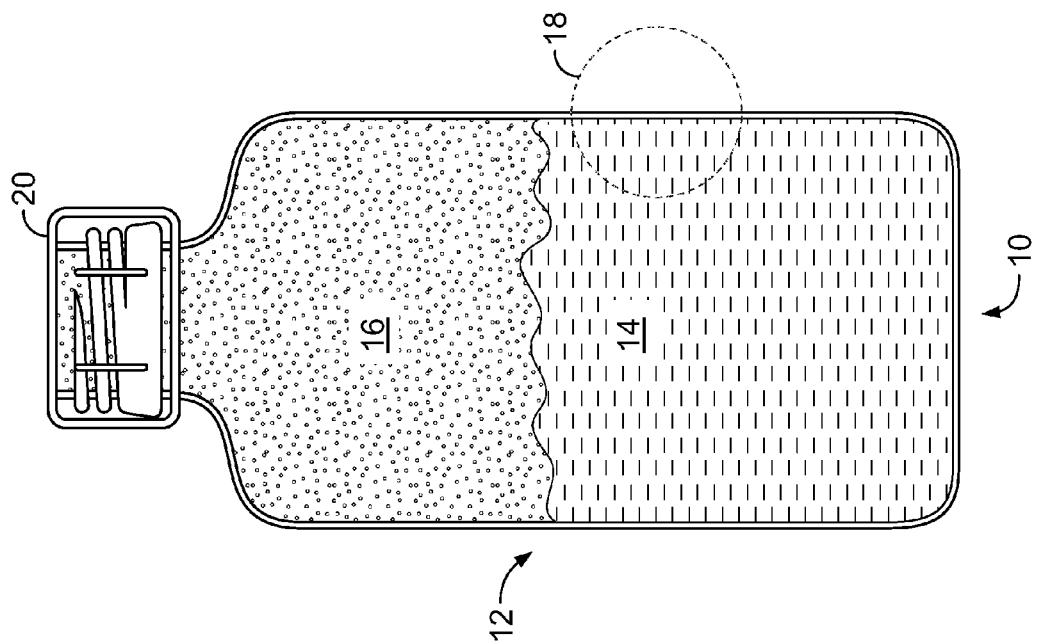

As depicted in the embodiments of FIG. 1, an embodiment 10 of the present invention is a container 12 for storing a fluid that may include a liquid 14 and a gas 16, the container 12 having walls 18 (also depicted in FIGS. 1A and 1B) made of a biodegradable material, and a cap 20, also made of a biodegradable material.

FIG. 1A depicts an embodiment of a composite wall 18A having a composite casing 22 made of a biodegradable composite polymer, prepared by intermixing a biodegradable resin and a plasticizer together.

FIG. 1B depicts an embodiment of a layered wall 18B having an inner coating 24 of silicone plasma, silicone hard coat resin or liquid rubber and an outer wall 26 of polymer, consisting of biodegradable resin and plasticizer. An outer base 26 of biodegradable material is formed, possibly by blow-molding or extrusion, and then an inner coating 24 of silicone is applied to provide a surface intended for contact with the fluid. The silicone may be a silicone hard coat resin or liquid rubber coated or applied onto the bioplastic resin, or the silicone may be silicone plasma deposited onto the bioplastic resin.

Figure 2:
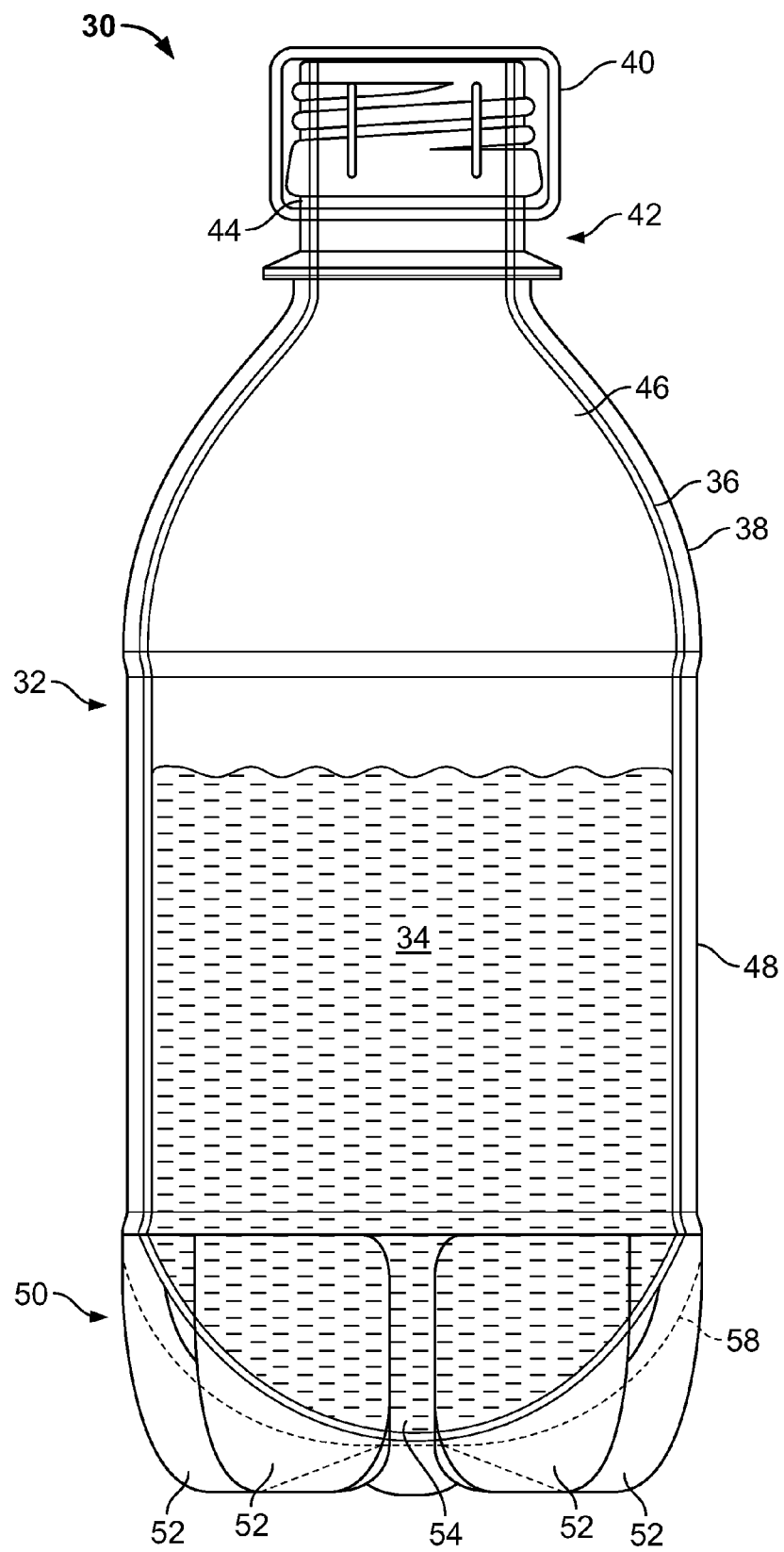
FIG. 2 depicts a front view of an embodiment of the present invention.
Figure 3:
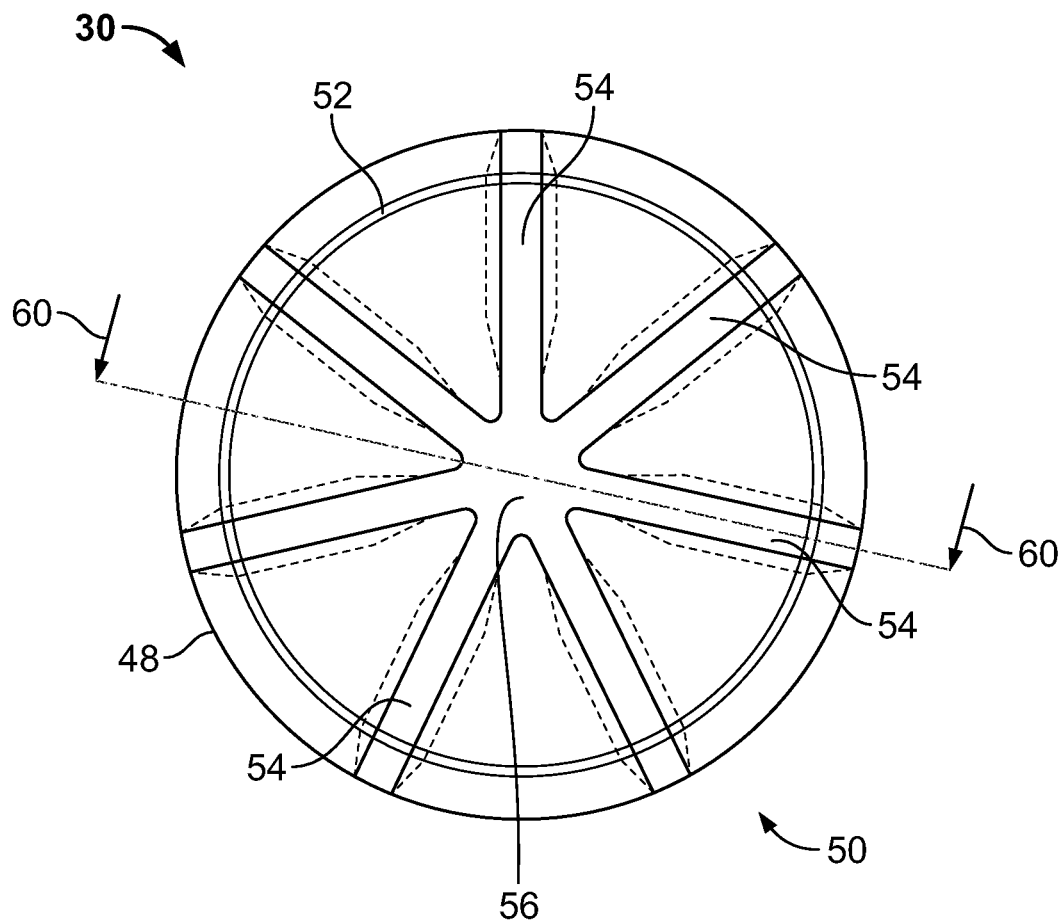
FIG. 3 depicts a bottom view of an embodiment of the present invention.
Figure 4:
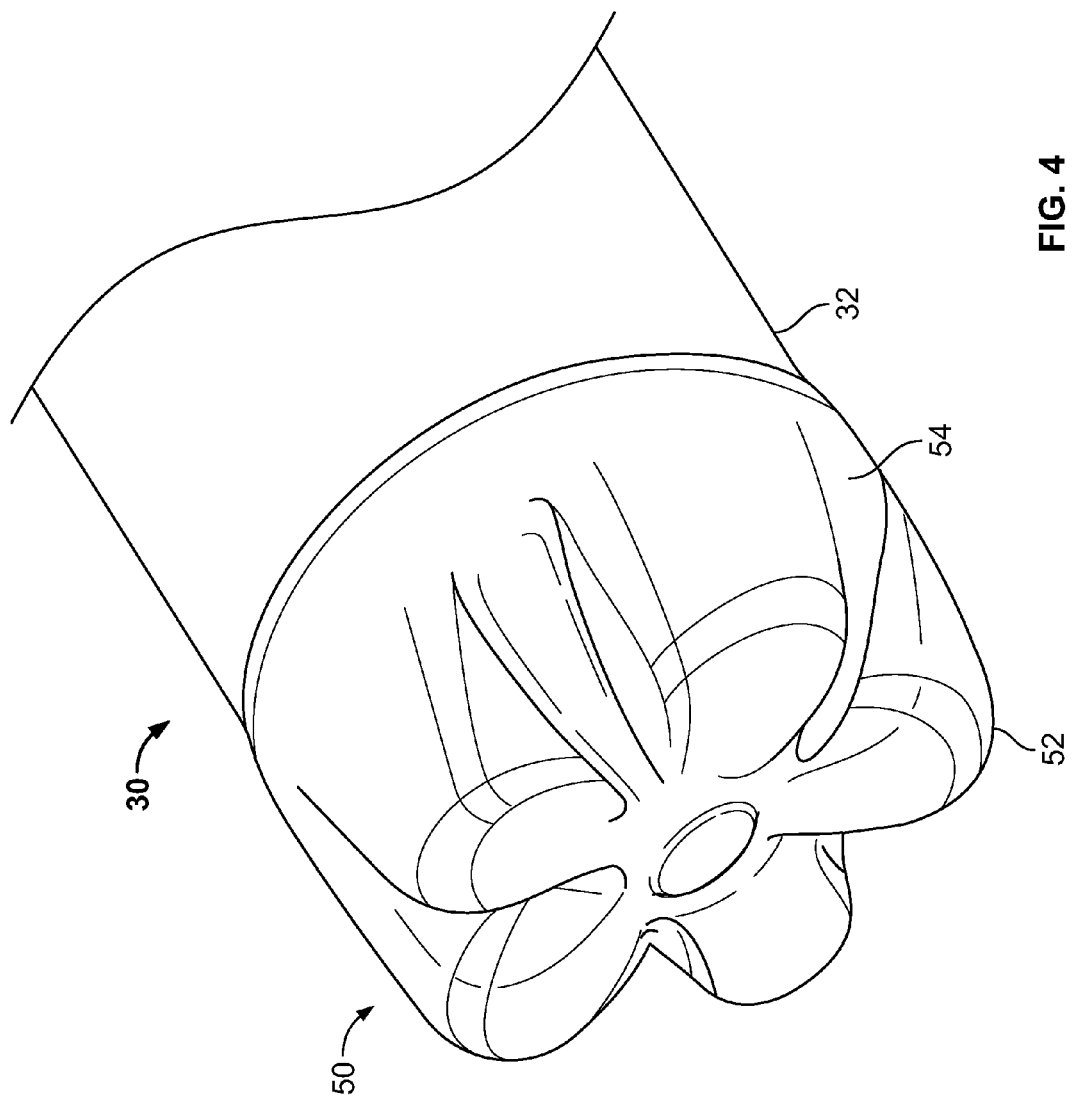
FIG. 4 depicts an oblique view of an embodiment of the present invention.

FIG. 2 depicts a front view of an embodiment of the present invention, FIG. 3 depicts a bottom view of FIG. 2 taken along line 60, and FIG. 4 depicts an oblique view of an embodiment. An embodiment 30 includes a container 32 for storing a liquid 34, with an inner casing 36, a biodegradable outer casing 38, and a biodegradable cap 40. The container 32 may be in the shape of a bottle, having an upper portion 42 including a neck 44, shoulder 46, and a generally cylindrical main body portion including a side wall 48 and a base 50. The inner casing 36 may include a layer made of amorphous plasma deposited silicone dioxide barrier coating, or an inner membrane made from silicone hard coat resin or liquid rubber, respectively, on the food contact surface. The base 50 includes four to seven angularly spaced downwardly projecting feet 52, generally parallel-sided straps 54 between the feet 52, and a central area 56 defining a smooth domed generally pressure-vessel-shaped surface 58. This surface 58 may be roughly hemispherical to help withhold high pressures and avoid creep, but the central area 56 may be flat. The surface 58 may be entirely convex or flat, as seen from outside with no re-entrant portions.

In an embodiment, the bottom of the bottle may have somewhat greater thickness than the sidewall of the body of the bottle, to help have greater strength and resistance to gas permeation. Other embodiments have different shapes of the bottom may change, to accommodate the stress of the liquid and gas pressure in the bottle. If the liquid contents under elevated pressure do not distort the flat bottom of the bottle or make it fracture, the bottle may remain steady and not topple.

In an embodiment, the bottle may be fabricated by blow-molding or extruding bioplastic such as polylactic acid (PLA) or poly-3-hydroxybutyrate (PHB). These and other resins can be applied, with or without a plasticizers added, that may include (but are not limited to) poly 3 hydroxybutrate co 3 hydroxyhexanote (PHBH), polyhydroxybutyrate-co-valerate (PHB/V), chemical synthetic polymer such as polybutylene succinate (PBS), polybutylene succinate adipate (PBSA), polybutylene succinate carbonate, polycaprolactone (PCL), cellulose acetate (PH), or copoly-L-lactide(CPLA), and naturally occurring polymer, such as starch modified PVA+aliphatic polyester, or corn starch.

An embodiment may improve on the permeability of biodegradable resins, including (but not limited to) polylactic acid (PLA), poly 3 hydroxybutrate co 3 hydroxyhexanote (PHBH) and poly-3-hydroxybutyrate(PHB) resin, or other bioplastic, by adding plasticizers, including (but not limited to) silicone oxide and silicone dioxide, the range of 2 to 28%. The plasticizers are added to the biodegradable resin to form a bioplastic polymer, with improved barrier and permeability properties, to fluids, oxygen and carbon dioxide. The proportions of the plasticizers mixed would range from 2 to 28% total volume. The ratio may be varied to the desired permeability and barrier properties to be attained, based on each application.

In embodiments, in order to improved gas barrier, a silicone hard coat resin or liquid rubber membrane or a silicone dioxide plasma coating may be applied, inside or outside to a structure that has already been formed with the biodegradable polymer or resin or paper.

In an embodiment, the silicone dioxide plasma may be applied using a technology called plasma impulse chemical vapor deposition (PICVD, also plasma impulsed ccal vapor deposition). This process uses pulsed plasma in combination with oxygen and a volatile precursor gas to apply a silicone dioxide coating to the inside or outside of a bioplastic container. PICVD permits reduced substrate temperature relative to continuous plasma processes, and may avoid damaging the surface of containers or bioplastics. In addition, because the precursor gas is renewed after every pulse, an even coating distribution may be achieved. Layer thickness can vary from 10 to 110 nm, or be tailored to the barrier requirements or permeability parameters of each application.

In an embodiment, a silicone hard coat resin may be applied to the inside or outside of a bioplastic container. Silicone hard coat resin has been found to yield a clear, mar-resistant film when applied to a suitably prepared polylactic polymer (PLA), polyhydroxyalkonate (PHA), or poly 3 hydroxybutrate co 3 hydroxyhexanote (PHBH substrate). Resin can be applied by flow, dip, spin, or spray coating, and may utilize or require ultraviolet or electron beam curing. The hard coat may give primerless adhesion to paper, PLA, PHA, and PHBH that are cast, extruded, molded, blow or injection molded. An embodiment of the resin may offer mar-resistance, high gloss, and protection from chemical attack.

An embodiment of a hard coat resin may include, for example, a mixture of silicone 2% to 15% or acrylates 75% to 85% or both, and a curing agent including a photoinitiator or sensitizer or both. The thickness of an embodiment of a hard coat may be, for example, 5 nm to 80 nm. The acrylates may include, but are not limited to, tripropylene glycol diacrylate, trimethylolpropane triacrylate, ethoxylated trimethylolpropane triacrylate, hexamethylene diacrylate, bisphenol A diglycidal ether diacrylate, aromatic urethane acrylate, alkoxylated hexanediol diacrylate, trifunctional acid ester acrylate, alkoxylated phenol acrylate, polyester acrylate, tricyclodene dimethanol diacrylate, and dipentaerythitol pentaacrylate. In embodiments, different or unique stability factors may be used in bottles depending on the products to be stored in the bottle. A hard coat may be prepared around this stability factor using an acrylate such as, but not limited to, the acrylates mentioned above, and could include other epoxy, polyester, silicone, or urethane based acrylates.

An embodiment of a hard coat may include a mixture of silicone and/or acrylates, and a photo initiator and/or sensitizer with adhesion properties to work with PLA, PHA, PHBH, paper, or other degradable containers. An embodiment of a hard coat may be applied to PLA, PHA, PHBH, paper, or other degradable containers using ultraviolet or electron beam radiation curing methods. A resin may be utilized to coat the container, and when the resin is cured, the coating will become hard.

I claim:

1. A biodegradable material, comprising:
   an acrylate that includes alkoxylated phenol acrylate;
   a curing agent to cure the acrylate; and
   a degradable material;
   wherein the acrylate and degradable material are either bonded together or intermixed together to provide a biodegradable material that is generally impermeable to fluids.

2. The biodegradable material of claim 1, wherein the degradable material is polyhydroxyalkonate (PHA).

3. The biodegradable material of claim 1, wherein the degradable material is poly 3 hydroxybutrate co 3 hydroxyhexanote (PHBH).

4. The biodegradable material of claim 1, wherein the biodegradable material further includes 2% to 15% silicone of the entire biodegradable material composition by weight.

5. A device comprising the biodegradable material of claim 1, further comprising:
   a container that includes the biodegradable material; and
   a releasable cap that includes the biodegradable material;
   wherein the container and cap cooperate to store a fluid.

6. A method of providing a biodegradable container for fluids, comprising:
   providing a resin including alkoxylated phenol acrylate;
   forming a casing, shaped to hold fluids, from a degradable material;
   adhering the resin to the casing; and
   curing the resin.

7. The method of claim 6, wherein the degradable material is polyhydroxyalkonate (PHA).

8. The method of claim 6, wherein the resin further includes 2% to 15% silicon of the total resin composition by weight.

9. The method of claim 6, further comprising:
   specifying a stability factor that includes high gloss stability for a container; and
   selecting an acrylate for the resin that provides the specified stability factor for the container.

10. The biodegradable material of claim 1, wherein the acrylate is mixed with silicon to provide a resin that is 2% to 15% silicone of the total resin composition by weight, and the resin is applied to the degradable material and cured to form a hard coat.

11. The biodegradable material of claim 1, wherein the acrylate, curing agent, and degradable material are intermixed to provide a composite biodegradable material.

12. The biodegradable material of claim 1, wherein the acrylate and curing agent are intermixed to provide a resin, and the resin is adhered onto the degradable material to provide a layered biodegradable material.

13. The biodegradable material of claim 1, wherein the acrylate is applied onto the degradable material and cured to provide a hard coat.

14. The method of claim 6, wherein the degradable material is poly 3 hydroxybutrate co 3 hydroxyhexanote (PHBH).

15. A method of providing a biodegradable container for fluids, comprising:
   specifying a stability factor that includes high gloss stability for a container;
   selecting an acrylate for the resin that provides the specified stability factor for the container, the acrylate selected from the list consisting of: tripropylene glycol diacrylate, trimethylolpropane triacrylate, ethoxylated trimethylolpropane triacrylate, hexamethylene diacrylate, bisphenol A diglycidal ether diacrylate, aromatic urethane acrylate, alkoxylated hexanediol diacrylate, trifunctional acid ester acrylate, alkoxylated phenol acrylate, polyester acrylate, tricyclodene dimethanol diacrylate, and dipentaerythitol pentaacrylate;
   forming a casing, shaped to hold fluids, from a degradable material;
   adhering the resin to the casing; and
   curing the resin.

16. The method of claim 15, wherein the acrylate is alkoxylated phenol acrylate.

* * * * *